UNITED STATES PATENT OFFICE.

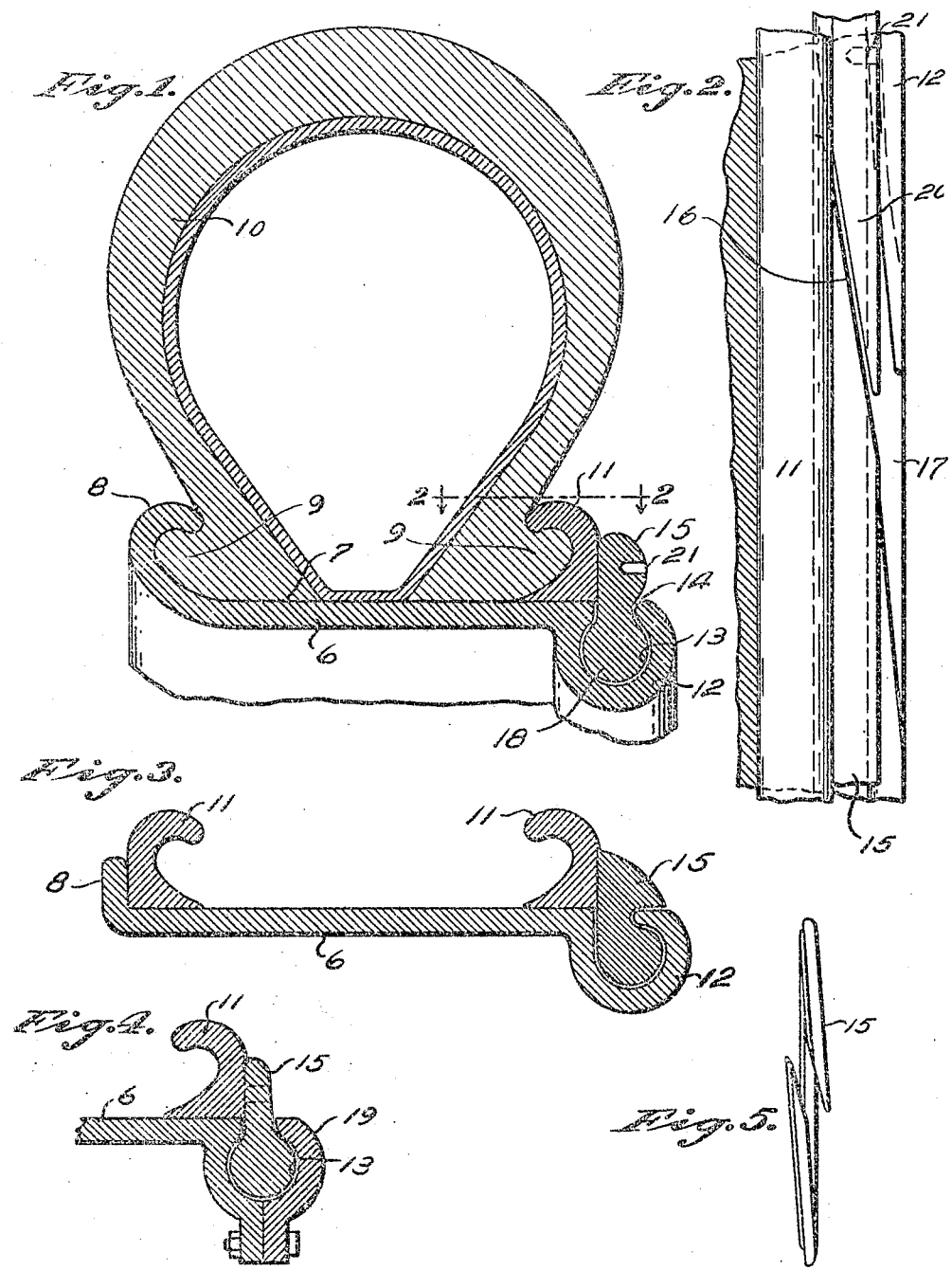

DANIEL D. GRIFFITHS, OF CHICAGO, ILLINOIS, ASSIGNOR OF ONE-HALF TO ELMER E. LAUGHLIN, OF CHICAGO, ILLINOIS.

VEHICLE-WHEEL RIM.

No. 833,520.   Specification of Letters Patent.   Patented Oct. 16, 1906.

Application filed October 27, 1905. Serial No. 284,695.

*To all whom it may concern:*

Be it known that I, DANIEL D. GRIFFITHS, a citizen of the United States of America, and a resident of Chicago, in the county of Cook and State of Illinois, have invented certain new and useful Improvements in Vehicle-Wheel Rims, of which the following is a specification.

This invention relates to vehicle-wheels, and particularly to the type which is provided with pneumatic or other forms of removable resilient tires.

The main object of this invention is to provide a form of locking device for securing clencher and other pneumatic tires upon the rim of a wheel in a manner which will permit of readily removing the tire without the use of tools and at the same time prevent the possibility of accidental release of the tire. This object is accomplished by the device shown in the accompanying drawings, in which—

Figure 1 is a transverse section of a wheel-rim and tire locking device constructed according to my invention, the same being shown as applied to a double-tube tire of the "clencher" type. Fig. 2 is a top plan, partly broken away, showing a portion of the rim and locking-ring at the part where the locking-ring is withdrawn and inserted into its seat. Figs. 3 and 4 are transverse sections of rims, showing modified forms of rims embodying this invention. Fig. 5 is a view of the locking-ring removed from the rim.

In the form shown in Fig. 1 the rim 6 has a cylindrical periphery 7 and is curled up at 8 along one edge of its periphery to fit the usual clencher-flange 9 of the tire 10. The other clencher-flange 9 of the tire is engaged by a retaining-ring 11, which fits upon the periphery of the rim and is removable therefrom to permit of access to the inner tube of the tire. The edge of the rim which is adjacent to the retaining-ring 11 is curled upon itself at 12 to form the seat 13, which extends around the rim and has a contracted slot 14, opening through the periphery. The interior of the seat 13 is of considerably greater width than the slot 14. The retaining-ring 11 is held against being forced sidewise off of the rim through pressure of the tire by means of a split locking-ring 15, which is seated in the seat 13 and extends outwardly beyond the periphery, so as to form an annular stop bearing against the side of the retaining-ring 11. The locking-ring 15 is preferably split at an angle, as shown at 16 in Fig. 2, and the rim has a channel 17, which extends spirally outward from the seat 13 to the adjacent edge of the rim. The channel 17 is disposed at an angle to the seat 13, so that the resilient locking-ring 15 may be slid endwise into its seat. The locking-ring 15 fits loosely within the seat 13, so that when the tire is deflated said locking-ring may be readily turned circumferentially around the periphery of the rim for inserting and withdrawing it from its groove. The ring 15 has a pin-hole 21 in its outer face to permit the insertion of a nail or pin for assisting in shifting said locking-ring. The inner edge 18 of the locking-ring 15 is enlarged to fit the interior of the seat 13 and prevent the ring from springing radially outward of the seat. This enlargement is preferably in the form of a bulb or beading extending along the entire length of the ring 16. The same purpose would be accomplished by enlarging the edge of the locking-ring only at certain intervals of its length. It will therefore be understood that the word "beading" as hereinafter used in the claims is intended to include either of the hereinbefore-mentioned structures or their equivalent.

In the form shown in Fig. 3 the edge 8 of the rim is bent outward to form a retaining-flange, and both clencher-flanges of the tire are held by removable retaining-rings 11. The locking-ring 15 is moved to a slight extent by forming the retaining beading or bulb on one side only and making the other side straight.

In the form shown in Fig. 4 the locking-ring 15 is made exactly the same on each side, so as to be interchangeable end for end in its seat. The rim in this case is also formed of two parts joined and bolted together along the seat 13. This construction is preferred in cases where the rim is to be subjected to extremely hard service. In such cases the outer part 19 of the rim may be removed to permit the removal of the locking-ring 15 when through accident the rim has become buckled so as to prevent the rotation of the ring 15 and its withdrawal through the channel 17 in the usual manner.

The operation of the device shown is as follows: The tire is first placed upon the rim, and the retaining-ring 11 is then slipped into position, so as to engage the outer clencher-flange 9 of the tire. Then while the tire is still deflated the locking-ring 15 is slid endwise into the channel 17, and thus screwed into position until both of its ends are adjacent to each other within the groove 13. The locking-ring 15 should preferably be turned far enough to bring the joint 16 at a point slightly beyond the channel 17. As soon as the tire is inflated its pressure against the retaining-ring 11 forces the same outwardly against the locking-ring 15 and prevents the possibility of said locking-ring shifting within its seat.

When it is desired to remove the tire or to gain access to the inner tube, the air is permitted to escape from the tire, and as soon as the tire has become deflated the pressure of the retaining-ring 11 upon the locking-ring 15 will be released. Since the bead 18 fits loosely in the seat 13, the locking-ring may now be readily rotated in its seat, and its end 20 may be sprung slightly toward one side, so as to permit it to pass out of the channel 17.

What I claim as my invention, and desire to secure by Letters Patent, is—

1. A vehicle-wheel comprising a rim having an annular seat extending around one edge thereof, and a locking-ring, separate from the tire, mounted in said seat and extending outwardly beyond the periphery of the rim for retaining a tire thereon, said seat and the adjacent portion of said ring being formed to slide circumferentially into interlocking engagement with each other for preventing said ring from springing out of said seat in a radial direction.

2. A vehicle-wheel comprising a rim having an annular seat extending around one edge thereof, and a split locking-ring, separate from the tire, mounted in said seat and extending outwardly beyond the rim for retaining a tire thereon, said seat and the adjacent portion of said ring being formed to slide circumferentially into interlocking engagement with each other for preventing said ring from springing out of said seat in a radial direction.

3. A vehicle-wheel comprising a rim having a seat extending around its periphery, said seat comprising a slot having an enlarged interior, a locking-ring extending around and beyond the periphery of said rim and having a beaded edge fitting within said seat and adapted to prevent the ring from springing out of the seat, said rim having therein a channel leading spirally outwardly from said seat toward one edge of the rim, said ring being split at an oblique angle and adapted to be passed endwise through said channel into said seat.

4. A vehicle-wheel comprising a rim having therein a seat, an endless tire-holding ring mounted on said rim, and a locking device seated in said seat and engaging said ring to prevent the same from shifting laterally off of the rim, said locking device having interlocking engagement with the seat independent of said ring and adapted to prevent said locking device from being sprung transversely out of the seat, and said seat being adapted to permit said locking device to be withdrawn therefrom when moved longitudinally of the seat.

5. A vehicle-wheel comprising a rim having an annular groove in its periphery, said groove being of uniform cross-section and having an enlarged interior inward of the periphery of the rim, an endless tire-retaining ring mounted on the rim, separate from the tire, a locking-ring extending around said groove, having an enlarged portion fitting the enlarged interior of said groove, and adapted to engage said retaining-ring and prevent the same from shifting off of the rim, and a channel extending angularly outwardly from said groove toward one side of the rim and adapted to permit said enlarged portion to pass out of the groove to permit said locking-ring to be withdrawn from engagement with the tire-retaining ring when said locking-ring is shifted around the rim.

6. A vehicle-wheel comprising a rim having an annular seat in the periphery thereof extending along one edge, said seat comprising a groove of uniform transverse cross-section enlarged in the interior and relatively narrower at the periphery of the rim, a split locking-ring seated in said groove and having an enlargement on its inner edge fitting the interior of said groove, a channel in said rim extending at an angle to said groove and adapted to permit said locking-ring to be slid endwise into the groove, said rim being formed of two parts separably joined along said groove.

7. A vehicle-wheel comprising a rim having therein a seat, said seat comprising an annular slot extending along one edge of the periphery of the rim and having an enlarged interior inward of said periphery, a tire-retaining ring, and a locking-ring having a beaded portion fitting within said seat, said rim having therein a channel leading outwardly from said seat, and said locking-ring being adapted to be passed endwise through said channel and into the seat to form an annular stop for engaging and retaining said tire-retaining ring upon the rim.

Signed at Chicago this 17th day of October, 1905.

DANIEL D. GRIFFITHS.

Witnesses:
E. A. RUMMLER,
GLEN C. STEPHENS.